US008917657B2

(12) United States Patent
Ji (10) Patent No.: US 8,917,657 B2
(45) Date of Patent: Dec. 23, 2014

(54) METHOD AND SYSTEM FOR GENERATING AND READING AN AUTOMATIC REPEAT REQUEST (ARQ) STATUS FEEDBACK MESSAGE (75) Inventor: Baowei Ji, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 574 days.

(21) Appl. No.: 12/625,277

(22) Filed: Nov. 24, 2009

(65) Prior Publication Data

US 2010/0182949 A1 Jul. 22, 2010

Related U.S. Application Data (60) Provisional application No. 61/205,638, filed on Jan. 22, 2009.

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04B 7/005 | (2006.01) |
| H04B 1/44 | (2006.01) |
| H04W 4/00 | (2009.01) |
| H04L 1/16 | (2006.01) |

(52) U.S. Cl.
CPC ............ H04L 1/1635 (2013.01); H04L 1/1671 (2013.01)
USPC ........... 370/328; 370/229; 370/235; 370/278; 370/282

(58) Field of Classification Search
None
See application file for complete search history.

(56) References Cited

U.S. PATENT DOCUMENTS 7,720,070 B1 * 5/2010 Li .................................. 370/392
2007/0124642 A1 5/2007 Suh et al.
2007/0277073 A1 * 11/2007 Zegers et al. ................. 714/748
2009/0175206 A1 * 7/2009 Wang et al. ................... 370/310
2010/0014446 A1 1/2010 Chun et al.

FOREIGN PATENT DOCUMENTS

| CN | 1914845 A | 2/2007 |
| JP | 2006054897 A | 2/2006 |
| JP | 2008005442 A | 1/2008 |
| KR | 1020050069903 A | 7/2005 |
| KR | 100668680 B1 | 1/2007 |
| KR | 1020070003274 A | 1/2007 |
| KR | 1020080036344 A | 4/2008 |
| KR | 20080065887 A | 7/2008 |
| WO | WO 2008/094120 A1 | 8/2008 |

OTHER PUBLICATIONS

International Search Report dated Sep. 8, 2010 in connection with International Patent Application No. PCT/KR2010/000415.
Written Opinion of the International Searching Authority dated Sep. 8, 2010 in connection with International Patent Application No. PCT/KR2010/000415.
Chinese Office Action dated Jun. 27, 2013 in connection with Chinese Patent Application No. 2010-800050161; 19 pages.
Japanese Office Action dated Dec. 10, 2013 in connection with Japanese Patent Application No. 2011-547779; 7 pages.
3GPP TSG-RAN WG2 meeting #59bis; "RLC status PDU type and format"; Shanghai, China; Oct. 8-12, 2007; R2-073970; 2 pages.
Translated Chinese Office Action dated Mar. 20, 2014 in connection with Chinese Patent Application No. 2010800050161; 17 pages.
Translated Japanese Notice of Patent Grant dated Apr. 1, 2014 in connection with Japanese Patent Application No. 2011-547779, 5 pages.

* cited by examiner

Primary Examiner — Faruk Hamza
Assistant Examiner — Diane Lo (57) ABSTRACT

An automatic repeat request (ARQ) receiver is provided. The ARQ receiver comprises a receiver configured to receive a plurality of ARQ blocks. The ARQ receiver further comprises a processor configured to generate a feedback message configured to provide status of the plurality of ARQ blocks. The feedback message comprises an acknowledgement sequence number (ACK_SN) field and a flag field. The processor is configured to provide a first value in the flag field if the feedback message contains only the ACK_SN field and the flag field. The processor is also configured to provide a second value in the flag field if the feedback message contains one or more fields in addition to the ACK_SN field and the flag field.

20 Claims, 8 Drawing Sheets

| SN | n | n+1 | n+2 | n+3 | n+4 | n+5 | n+6 | n+7 | n+8 | n+9 |
|---|---|---|---|---|---|---|---|---|---|---|
| RECEIVED | YES | NO | YES | NO | YES | NO | YES | NO | YES | NO |

FIG. 6

| SN | n | n+1 | n+2 | n+3 | n+4 | n+5 | n+6 | n+7 | n+8 | n+9 |
|---|---|---|---|---|---|---|---|---|---|---|
| RECEIVED | YES | YES | YES | NO | YES | NO | YES | YES | YES | YES |

| SYNTAX | SIZE (BIT) | NOTES | |
|---|---|---|---|
| ARQ_Feedback_IE{LAST}{ | VARIABLE | - | |
| Type | 1 | 0 = ARQ FEEDBACK IE FOR ARQ BLOCK<br>1 = ARQ FEEDBACK IE FOR ARQ SUB-BLOCK<br>THIS BIT IS ALWAYS SET TO "0" | 1101 |
| Last | 1 | 0 = MORE ARQ FEEDBACK IE IN THE LIST<br>1 = LAST ARQ FEEDBACK IE IN THE LIST | 1103 |
| Flow ID | 4 | THE ID OF THE FLOW<br>BEING REFERENCED | |
| Flag | 1 | 0 = CUMULATIVE ACK<br>1 = SELECTIVE ACK MAP EXISTENCE | 1105 |
| SN | 10 | FLAG = 0, ARQ BLOCKS UP TO AND INCLUDING SN HAVE BEEN RECEIVED SUCCESSFULLY<br>FLAG = 1, ARQ BLOCKS LESS THAN SN HAVE BEEN RECEIVED SUCCESSFULLY | 1107 |
| while (Flag == 1){ | | | |
| Selective ACK MAP | 7 | EACH BIT REPRESENTS ACK OR NACK OF CORRESPONDING ARQ BLOCK. "0" IS NACK AND "1" IS ACK. FIRST MSB OF THE FIRST ACK MAP REPRESENTS ACK OR NACK INFORMATION OF SN. CONTIGUOUS BITS AFTER FIRST MSB OF THE FIRST ACK MAP IS CORRESPONDING TO CONTIGUOUS SN | 1109 |
| Flag | 1 | 0 = NO MORE SELECTIVE ACK MAP<br>1 = ANOTHER SET OF SELECTIVE ACK MAP AND FLAG FOLLOWS | 1111 |
| } | | | |
| Reserved | VARIABLE | | |
| } | | | |

FIG. 11

| SYNTAX | SIZE (BIT) | NOTES | |
|---|---|---|---|
| ARQ_Feedback_IE2(LAST){ | VARIABLE | - | |
| Type | 1 | 0 = ARQ FEEDBACK IE FOR ARQ BLOCK<br>1 = ARQ FEEDBACK IE FOR ARQ SUB-BLOCK THIS BIT IS ALWAYS SET TO "1" | 1201 |
| Last | 1 | 0 = MORE ARQ FEEDBACK IE IN THE LIST<br>1 = LAST ARQ FEEDBACK IE IN THE LIST | 1203 |
| Flow ID | 4 | THE ID OF THE FLOW BEING REFERENCED | |
| Num_SN | 4 | NUMBER OF ARQ BLOCKS HAVING AN ARQ SUB-BLOCK ERROR | 1205 |
| for (i = 0; i<Num_SN;i++){ | | | |
| SN | 10 | ARQ BLOCK SEQUENCE NUMBER | |
| Flag | 1 | 0 = CUMULATIVE ACK<br>1 = SELECTIVE ACK MAP EXISTENCE | 1207 |
| SUB_SN | TBD | ARQ SUB-BLOCK SEQUENCE NUMBER | |
| while (Flag == 1) { | | | |
| Selective ACK MAP | 7 | EACH BIT REPRESENTS ACK OR NACK OF CORRESPONDING ARQ BLOCK. "0" IS NACK AND "1" IS ACK. FIRST MSB OF THE FIRST ACK MAP REPRESENTS ACK OR NACK INFORMATION OF SN. CONTIGUOUS BITS AFTER FIRST MSB OF THE FIRST ACK MAP IS CORRESPONDING TO CONTIGUOUS SN | 1209 |
| Flag | 1 | 0 = NO MORE SELECTIVE ACK MAP<br>1 = ANOTHER SET OF SELECTIVE ACK MAP AND FLAG FOLLOWS | 1211 |
| } | | | |
| } | | | |
| RESERVED | VARIABLE | | |
| } | | | |

FIG. 12

METHOD AND SYSTEM FOR GENERATING AND READING AN AUTOMATIC REPEAT REQUEST (ARQ) STATUS FEEDBACK MESSAGE

CROSS-REFERENCE TO RELATED APPLICATION(S) AND CLAIM OF PRIORITY

The present application is related to U.S. Provisional Patent No. 61/205,638, filed Jan. 22, 2009, entitled "METHOD FOR ARQ STATUS FEEDBACK WITH MINIMUM OVERHEAD". Provisional Patent No. 61/205,638 is assigned to the assignee of the present application and is hereby incorporated by reference into the present application as if fully set forth herein. The present application hereby claims priority under 35 U.S.C. §119(e) to U.S. Provisional Patent No. 61/205,638.

TECHNICAL FIELD OF THE INVENTION

The present application relates generally to communication systems and, more specifically, to a method and system for providing feedback to an automatic repeat request (ARQ) transmitter.

BACKGROUND OF THE INVENTION

The 3rd Generation Partnership Project Evolved Universal Terrestrial Radio Access Network (3GPP E-UTRAN) (a.k.a., Long Term Evolution or LTE) specifies a method for an automatic repeat request (ARQ) receiver to send feedback to an ARQ transmitter in which the sequence numbers of missing packets are explicitly listed one by one. IEEE 802.16e and its associated WiMAX system use another ARQ feedback method that includes a number of message formats for indicating the missing parts.

SUMMARY OF THE INVENTION

An automatic repeat request (ARQ) receiver is provided. The ARQ receiver comprises a receiver configured to receive a plurality of ARQ blocks. The ARQ receiver further comprises a processor configured to generate a feedback message configured to provide status of the plurality of ARQ blocks. The feedback message comprises an acknowledgement sequence number (ACK_SN) field and a flag field. The processor is configured to provide a first value in the flag field if the feedback message contains only the ACK_SN field and the flag field. The processor is also configured to provide a second value in the flag field if the feedback message contains at least one ACK-MAP field in addition to the ACK_SN field and the flag field.

A method of operating an automatic repeat request (ARQ) receiver is provided. The method comprises receiving a plurality of ARQ blocks and generating a feedback message configured to provide status of the plurality of ARQ blocks. The feedback message comprises an acknowledgement sequence number (ACK_SN) field and a flag field. The method also comprises providing a first value in the flag field if the feedback message contains only the ACK_SN field and the flag field, and providing a second value in the flag field if the feedback message contains at least one ACK-MAP field in addition to the ACK_SN field and the flag field.

An automatic repeat request (ARQ) transmitter is provided. The ARQ transmitter comprises a transmitter configured to transmit a plurality of ARQ blocks and a receiver configured to receive a feedback message configured to provide status of the plurality of ARQ blocks. The feedback message comprises an acknowledgement sequence number (ACK_SN) field and a flag field. The ARQ transmitter also comprises a processor configured to determine that the feedback message contains only the ACK_SN field and the flag field if the flag field contains a first value. The processor is further configured to determine that the feedback message contains at least one ACK-MAP field in addition to the ACK_SN field and the flag field if the flag field contains a second value.

A method of operating an automatic repeat request (ARQ) transmitter is provided. The method comprises transmitting a plurality of ARQ blocks and receiving a feedback message configured to provide status of the plurality of ARQ blocks. The feedback message comprises an acknowledgement sequence number (ACK_SN) field and a flag field. The method further comprises determining that the feedback message contains only the ACK_SN field and the flag field if the flag field contains a first value, and determining that the feedback message contains at least one ACK-MAP field in addition to the ACK_SN field and the flag field if the flag field contains a second value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

With regard to the following description, it is noted that the LTE term "node B" is another term for "base station" used below. Also, the LTE term "user equipment" or "UE" is another term for "subscriber station" used below.

Figure 1:
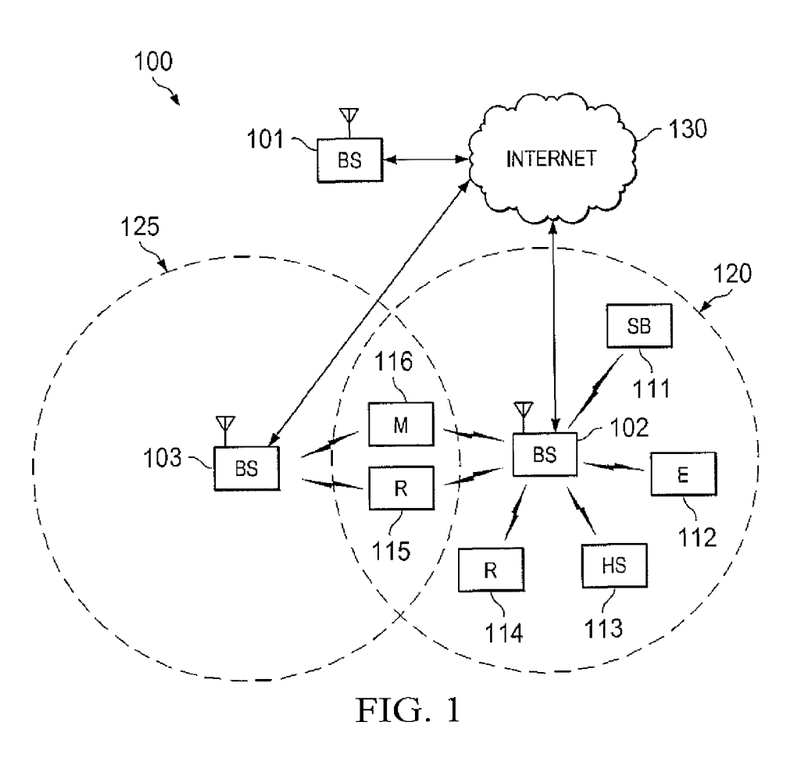
FIG. 1 illustrates an exemplary wireless network according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
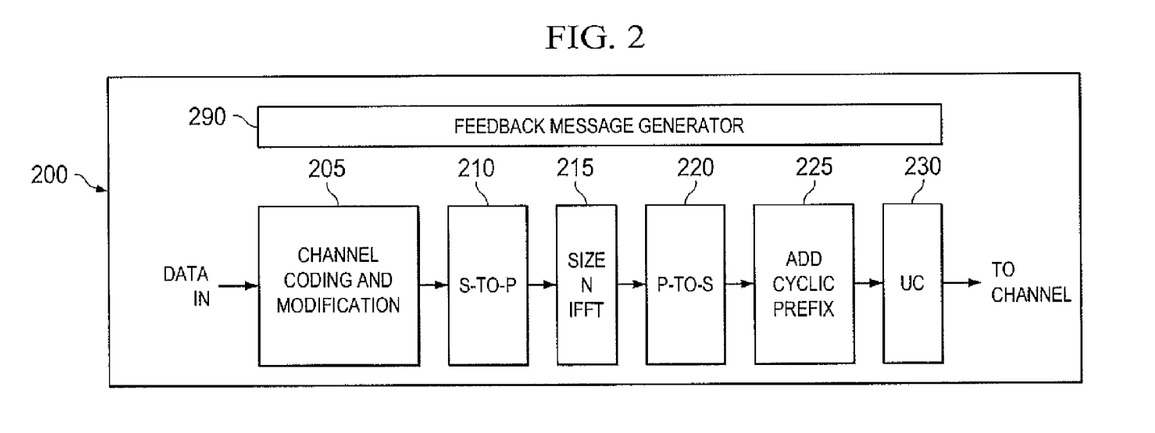
FIG. 2 is a high-level diagram of an orthogonal frequency division multiple access (OFDMA) transmitter according to one embodiment of the present disclosure.
Figure 3:
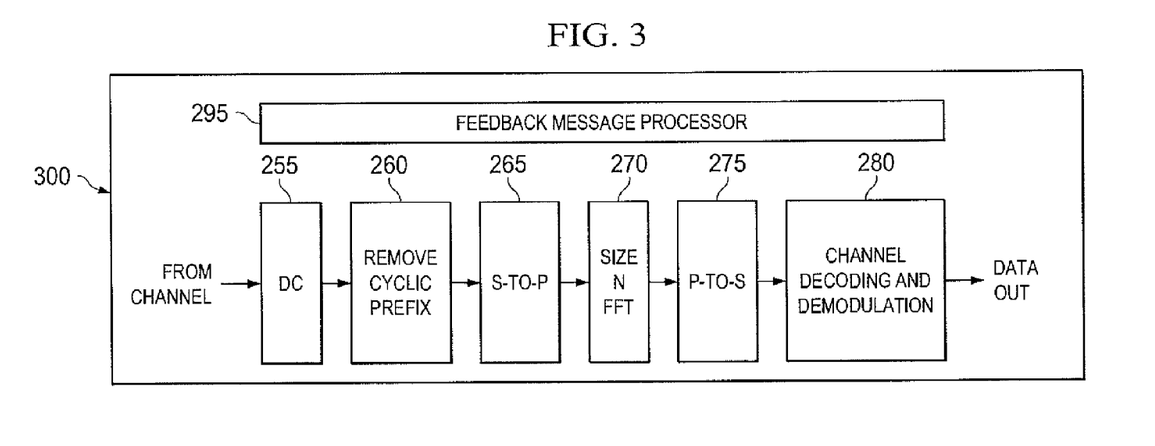
FIG. 3 is a high-level diagram of an OFDMA receiver according to one embodiment of the present disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, and a feedback message generator 290.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream. Feedback message processor 295 processes feedback messages received from ARQ receivers.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Automatic repeat request (ARQ) is an error-control method for data transmission that uses acknowledgements to achieve reliable data transmission. A feedback message is a message sent by an ARQ receiver to an ARQ transmitter to indicate that the receiver has correctly received a data frame or packet. The present disclosure describes a method and system for providing ARQ feedback.

Figure 4:
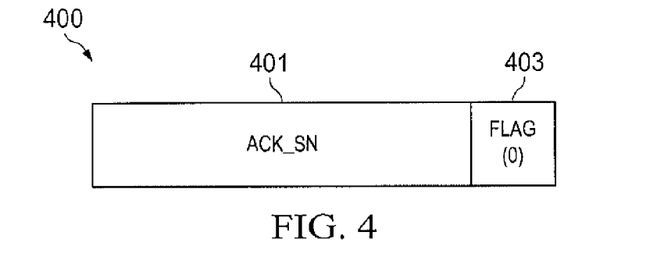
FIG. 4 shows an ARQ feedback message according to an embodiment of the present disclosure.

FIG. 4 shows an ARQ feedback message 400 according to an embodiment of the present disclosure.

As shown in FIG. 4, feedback message 400 includes an acknowledgment sequence number (ACK_SN) field 401 and a 1-bit flag field 403. In a particular embodiment, if the value in flag field 403 is a first value (e.g., 0), an ARQ transmitter determines that all the ARQ blocks up to ACK_SN (either inclusive or non-inclusive) have been successfully accepted by an ARQ receiver and that there is not an ACK-MAP field in feedback message 400 other than the ACK_SN field 401 and the flag field 403.

Figure 5:
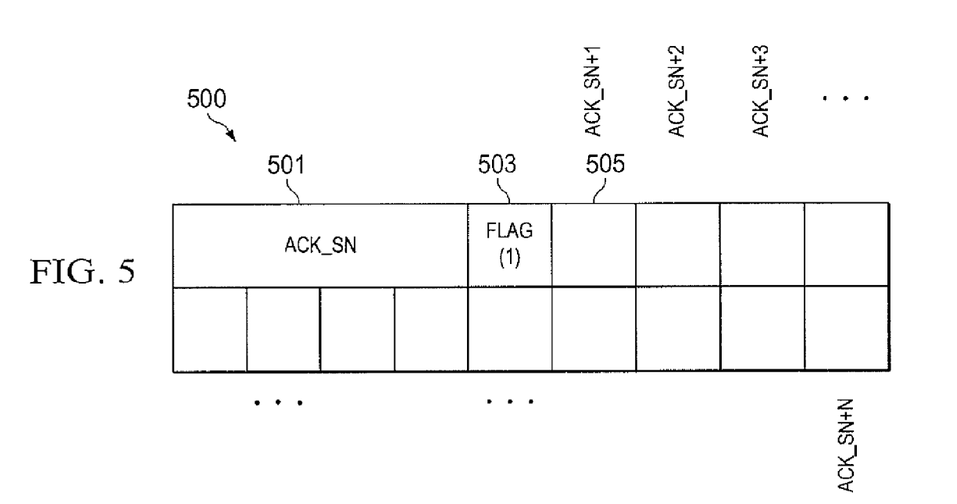
FIG. 5 shows an ARQ feedback message according to another embodiment of the present disclosure.

FIG. 5 shows an ARQ feedback message 500 according to another embodiment of the present disclosure.

Similar to feedback message 400, feedback message 500 also includes an acknowledgment sequence number (ACK_SN) field 501 and a 1-bit flag field 503. However, in this embodiment, the value in flag field 503 is a second value (e.g., 1). Having received the second value in flag field 503, the transmitter is informed that all the ARQ blocks up to ACK_SN (either inclusive or non-inclusive) have been successfully accepted by the receiver. However, the transmitter is also informed that feedback message 500 includes additional fields 505 in addition to ACK_SN field 501 and flag field 503.

In such a case, feedback message 500 provides the transmitter with the receiving status for the ARQ blocks from ACK_SN+1 to ACK_SN+N (called an ACK-MAP field), where N is the number of extra fields 505 in feedback message 500. Each extra field 505 corresponds to an ARQ SN. If a field 505 equals 0, for example, the ARQ block corresponding to that field 505 was received successfully. Otherwise, if the field 505 equals 1, for example, the ARQ block corresponding to that field 505 was not received successfully.

Figure 6:
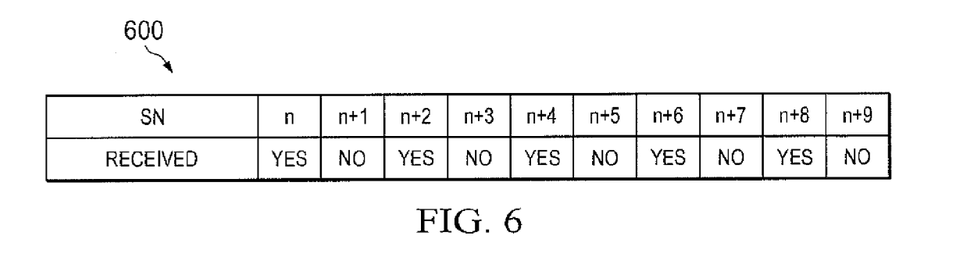
FIG. 6 illustrates a table providing the status of ARQ blocks according to an embodiment of the present disclosure.

FIG. 6 illustrates a table 600 providing the status of ARQ blocks according to an embodiment of the present disclosure.

In this embodiment, it is assumed that all ARQ blocks corresponding to an SN up to SN=n−1 have been received, and the status of ARQ blocks corresponding to an SN from n to n+9 are as shown in table 600. Such a feedback message would include the following fields:

one ACK_SN field (for example, ACK_SN field 501), which equals to n (non-inclusive as in this example), one flag field (for example, flag field 503), and nine (9) extra 1-bit fields that provide the status of ARQ blocks corresponding to an SN from n+1 to n+9.

In total, such a feedback message is conveyed using 20 bits. This results in an overhead saving of 72% compared to 71 bits used in the STATUS message of a prior art.

Figure 7:
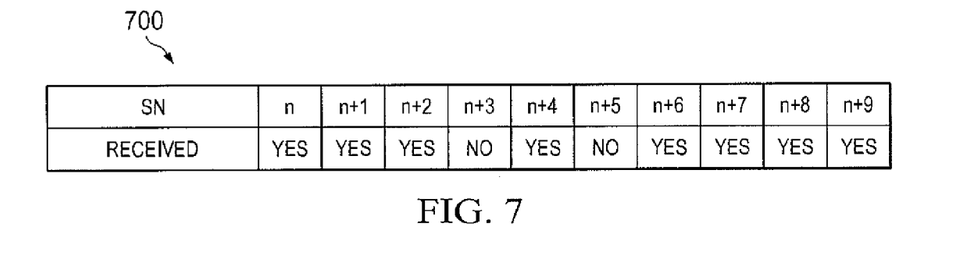
FIG. 7 illustrates a table providing the status of ARQ blocks according to another embodiment of the present disclosure.

FIG. 7 illustrates a table 700 providing the status of ARQ blocks according to another embodiment of the present disclosure.

In this embodiment, it is assumed that all ARQ blocks corresponding to an SN up to SN=n−1 have been received, and the status of ARQ blocks corresponding to an SN from n to n+9 are as shown in table 700. Such a feedback message would include the following fields:

one ACK_SN field (for example, ACK_SN field 501), which equals to n (again non-inclusive as in this example), one flag field (for example, flag field 503), and nine (9) extra 1-bit fields that provide the status of ARQ blocks corresponding to an SN from n+1 to n+9.

In total, such a feedback message is conveyed using 20 bits. This results in an overhead saving of 43% compared to 35 bits used in the STATUS message of the same prior art.

Figure 8:
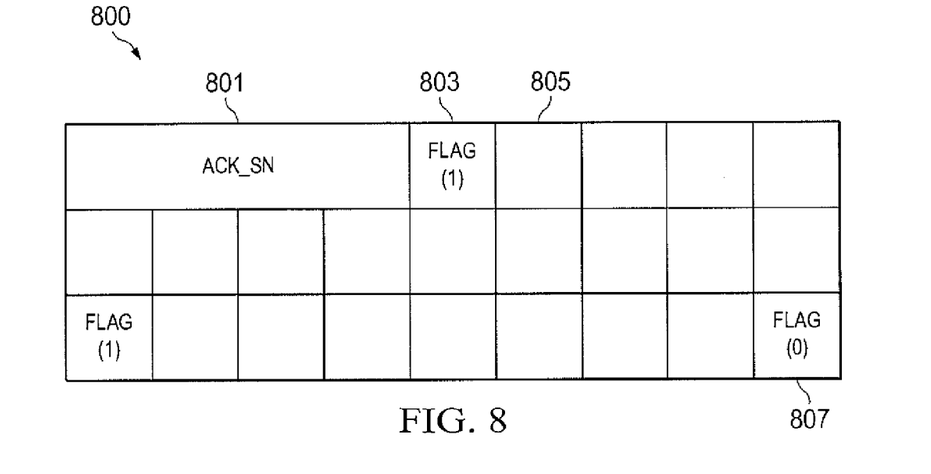
FIG. 8 shows an ARQ feedback message according to yet another embodiment of the present disclosure.

FIG. 8 shows an ARQ feedback message 800 according to yet another embodiment of the present disclosure.

Feedback message 800 includes an acknowledgment sequence number (ACK_SN) field 801 and a first flag field 803. Feedback message 800 illustrates another embodiment for specifying the length of the extra fields when the first flag field 803 equals a second value such as 1. In one embodiment, the length of the extra fields could be a pre-determined value (for example, 16 bits) with each bit corresponding to an ARQ SN. In this case, first flag field 803 also can be used to form a chain of fixed-length extra flag fields 805 until a subsequent flag field 807 equals a first value such as 0.

Alternatively, the length of feedback message 800 could be explicitly specified in the message or implicitly inferred from other message fields. In either case, all the remaining fields in the feedback message 800 could be used for the extra flag fields 805 with each flag field 805 corresponding to an ARQ SN. In the case shown in FIG. 8, the number of extra flag fields 805 is variable.

The present disclosure also provides a method for handling the loss of an ARQ feedback message itself. As shown in FIGS. 4, 5, and 8, each time a transmitter receives an ARQ feedback message, the transmitter is informed that all the ARQ SNs up to ACK_SN (either inclusive or non-inclusive) have been successfully received. Therefore, the latest ARQ feedback message automatically offers all the information that might have been missed in the previous lost ARQ feedback message. In other words, the feedback messages of the present disclosure are robust even when a certain ARQ feedback message gets lost. In particular embodiments, the ARQ transmitter can poll the ARQ receiver if the transmitter has not received a certain number of ARQ feedback messages within a certain time.

Figure 9:
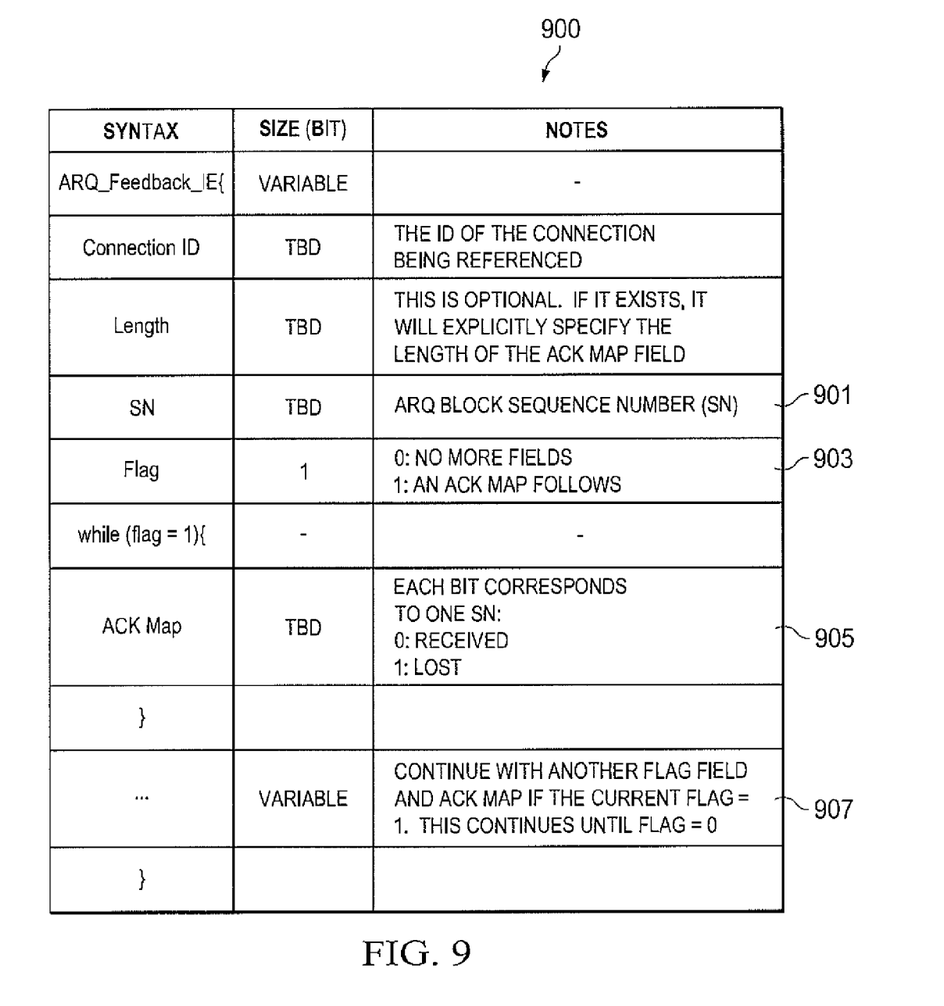
FIG. 9 shows an ARQ feedback message format according to an embodiment of the present disclosure.

FIG. 9 shows an ARQ feedback message format 900 according to an embodiment of the present disclosure.

As indicated at line 901, message format 900 includes an ARQ block sequence number. Line 903 provides a flag field where a value of 0 indicates to the transmitter that there are no more fields in the feedback message, and a value of 1 indicates that an ACK MAP follows. While the flag field has a value of 1, line 905 indicates that each bit corresponds to an SN and that a value of 0 indicates to the transmitter that the ARQ block corresponding to the SN was received, and a value of 1 indicates that the ARQ block corresponding to the SN was lost. As indicated at line 907, the transmitter then continues reading another flag field and ACK MAP until the transmitter reaches a flag field with a value of 0.

Figure 10:
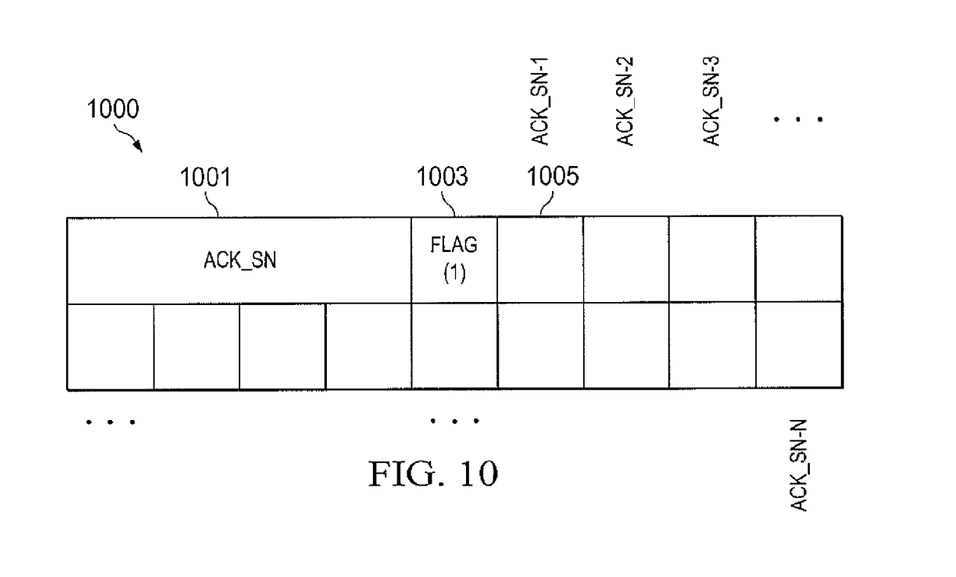
FIG. 10 shows an ARQ feedback message according to another embodiment of the present disclosure.

FIG. 10 shows an ARQ feedback message 1000 according to another embodiment of the present disclosure.

Similar to feedback message 500, feedback message 1000 also includes an acknowledgment sequence number (ACK_SN) field 1001 and a 1-bit flag field 1003. However, in this embodiment, if the value in flag field 1003 is a second value (e.g., 1), the transmitter is informed of the status of the ARQ blocks 1005 corresponding to ACK_SN–N to ACK_SN, where N is the number of extra fields in the message. Each extra field corresponds to an ARQ SN. In a particular embodiment, if flag field 1005 equals 0, the corresponding ARQ block was received successfully. Otherwise, the ARQ block was not received successfully. Note that the interpretation of the ACK_SN field 1001 is different from the ACK_SN field 501 in FIG. 5. In FIG. 5, the receiver provides the transmitter with the receiving status for the ARQ blocks corresponding to ACK_SN+1 to ACK_SN+N instead of the status of the ARQ blocks corresponding to ACK_SN–N to ACK_SN.

Figure 11:
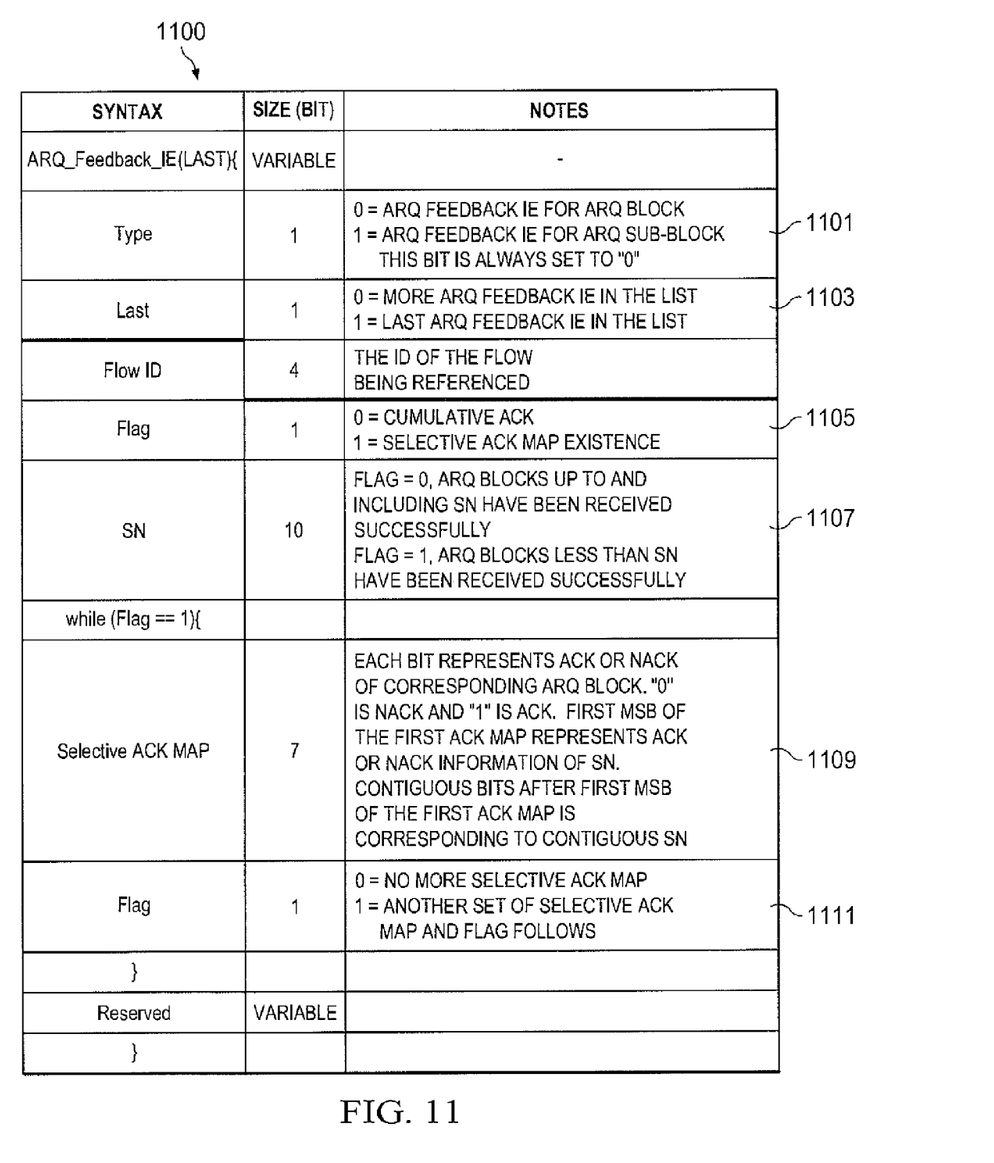
FIG. 11 illustrates an ARQ feedback information element (IE) format for an ARQ block according to an embodiment of the present disclosure.

FIG. 11 illustrates an ARQ feedback information element (IE) format 1100 for an ARQ block according to an embodiment of the present disclosure.

As indicated at line 1101, the IE format 1100 includes a type field. If the type field has a first value of 0 for example, then the ARQ feedback IE is for ARQ blocks. If the type field has a second value of 1 for example, then the ARQ feedback IE is for ARQ sub-blocks. Line 1103 indicates that the IE format 1100 also includes a last field. If the last field has a first value of 0 for example, then the transmitter determines that there are more ARQ feedback IEs in the list for the same or a different Flow ID. If the last field has a second value of 1 for example, then the transmitter determines that the current IE is the last ARQ feedback IE in the list.

As indicated at line 1105, the IE format 1100 includes a flag field. If the flag field has a first value of 0 for example, then the transmitter determines that the feedback message provides a cumulative acknowledgment for a group of ARQ blocks. If the flag field has a second value of 1 for example, then the transmitter determines that the feedback message provides a selective ACK MAP. The IE format 1100 also includes a sequence number (SN) field as indicated at line 1107. If the SN field has a first value of 0 for example, then the transmitter determines that ARQ blocks up and including SN (i.e., inclusive) have been received successfully by the receiver. If the flag field has a second value of 1 for example, then the transmitter determines that ARQ blocks less than SN (i.e., non-inclusive) have been received successfully by the receiver. Line 1109 indicates that while the flag field contains the second value of 1, the transmitter determines that each bit thereafter represents an acknowledgement (ACK) or a negative acknowledgement (NACK) of the corresponding ARQ block. As shown at line 1109, a value of 0 is a NACK in this embodiment, hence a value of 1 is an ACK. In a particular embodiment, the first most significant bit (MSB) of the first ACK MAP represents the ACK or NACK information for that SN. Contiguous bits after the first MSB of the first ACK MAP corresponds to contiguous SNs. Line 1111 indicates that a flag field value of 0 indicates to the transmitter that there are no more selective ACK MAPs, and a value of 1 indicates another set of ACK MAPs and flag follow.

Figure 12:
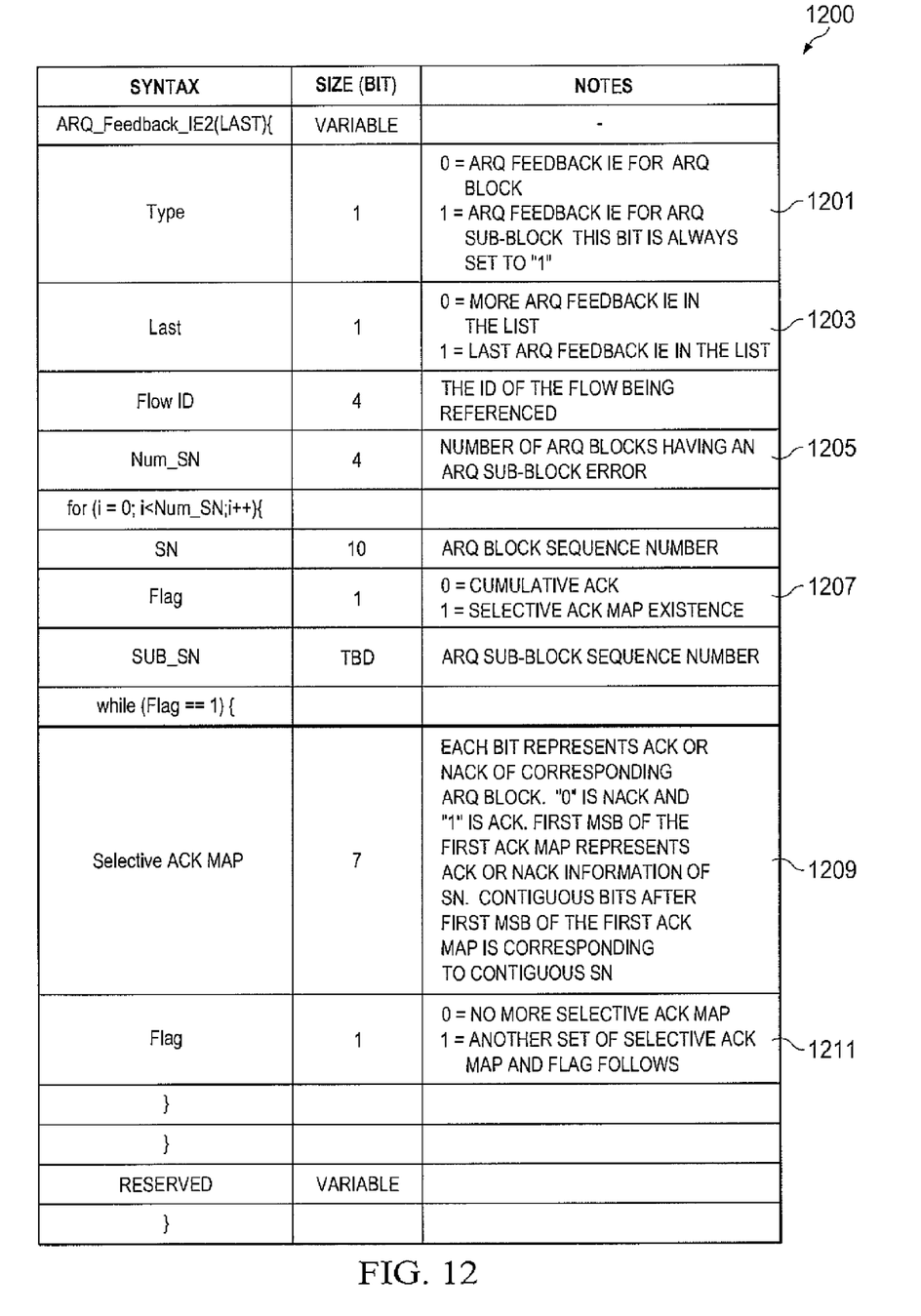
FIG. 12 illustrates an ARQ feedback information element (IE) format for ARQ sub-blocks according to an embodiment of the present disclosure.

FIG. 12 illustrates an ARQ feedback information element (IE) format 1200 for ARQ sub-blocks according to an embodiment of the present disclosure.

As indicated at line 1201, the IE format 1200 includes a type field. If the type field has a first value of 0 for example, then the ARQ feedback IE is for ARQ blocks. If the type field has a second value of 1 for example, then the ARQ feedback IE is for ARQ sub-blocks. Line 1203 indicates that the IE format 1200 also includes a last field. If the last field has a first value of 0 for example, then the transmitter determines that there are more ARQ feedback IEs in the list for the same or a different Flow ID. If the last field has a second value of 1 for example, then the transmitter determines that the current IE is the last ARQ feedback IE in the list. The IE format 1200 further includes a Num_SN field that provides the number of ARQ blocks having an ARQ sub-block error at line 1205. As indicated at line 1207, the flag field of the ARQ block is analyzed by the transmitter. If the flag field has a first value of 0 for example, then the transmitter determines that the feedback message provides a cumulative (i.e., inclusive) acknowledgment for a group of ARQ blocks. If the flag field has a second value of 1 for example, then the transmitter determines that the feedback message provides a selective ACK MAP (i.e., non-inclusive).

As shown at line 1209 of format 1200, a value of 0 in the selective ACK MAP field is a NACK, and a value of 1 is an ACK. In a particular embodiment, the first most significant bit (MSB) of the first ACK MAP represents the ACK or NACK information for that SN. Contiguous bits after the first MSB of the first ACK MAP corresponds to contiguous SNs. Line 1211 provides that a flag field value of 0 indicates to the transmitter that there are no more selective ACK MAPs, and a value of 1 indicates another set of ACK MAPs and flag follow.

Figure 13:
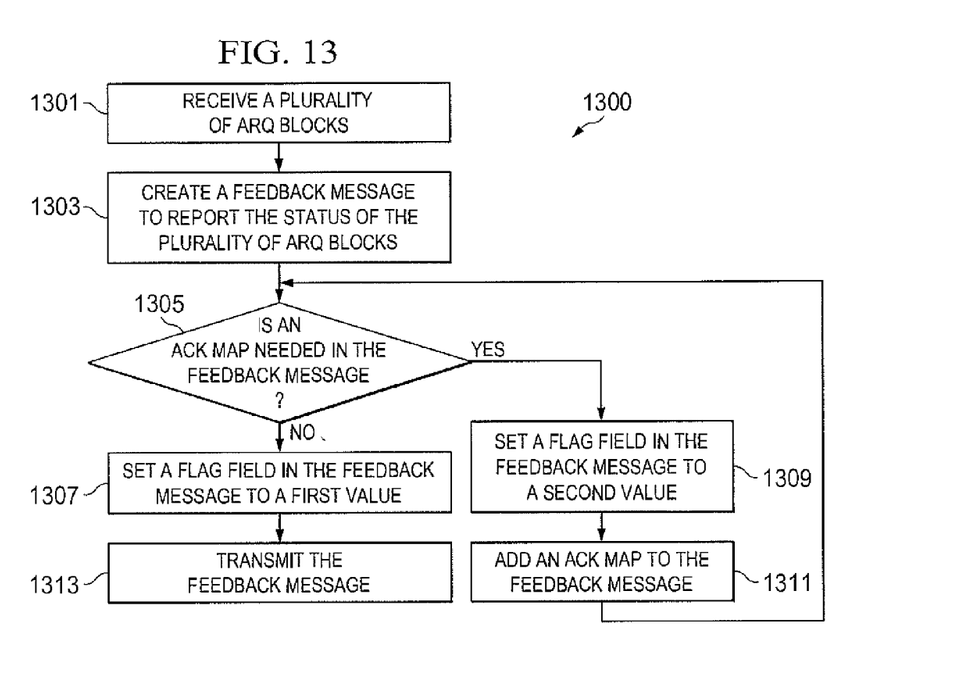
FIG. 13 illustrates a method of generating an ARQ feedback message according to an embodiment of the present disclosure.

FIG. 13 illustrates a method 1300 of generating an ARQ feedback message according to an embodiment of the present disclosure.

As shown in FIG. 13, an ARQ receiver receives a plurality of ARQ blocks (block 1301) from an ARQ transmitter and creates a feedback message to report the status of the plurality of ARQ blocks (block 1303). The receiver then determines if an ACK MAP in the feedback message is needed (block 1305). An ACK MAP is not needed if all the ARQ blocks up to ACK_SN have been successfully accepted by an ARQ receiver, and there is no need for additional fields in the feedback message other than an ACK_SN field and a flag field. To inform a transmitter that there are no additional fields in the feedback message other than an ACK_SN field and the flag field, the receiver sets a flag field in the feedback message to a first value such as 0 (block 1307). If an ACK MAP in the feedback message is needed, the receiver sets the flag field in the feedback message to a second value such as 1 (block 1309) and adds an ACK MAP to the feedback message (block 1311). The ARQ receiver then determines if there is another ACK MAP to be added to the feedback message (block 1305).

After all of the ACK MAPS are added to the feedback message, the ARQ receiver sets the final flag field to the first value (block 1307) and transmits the feedback message to the ARQ transmitter (block 1313).

Figure 14:
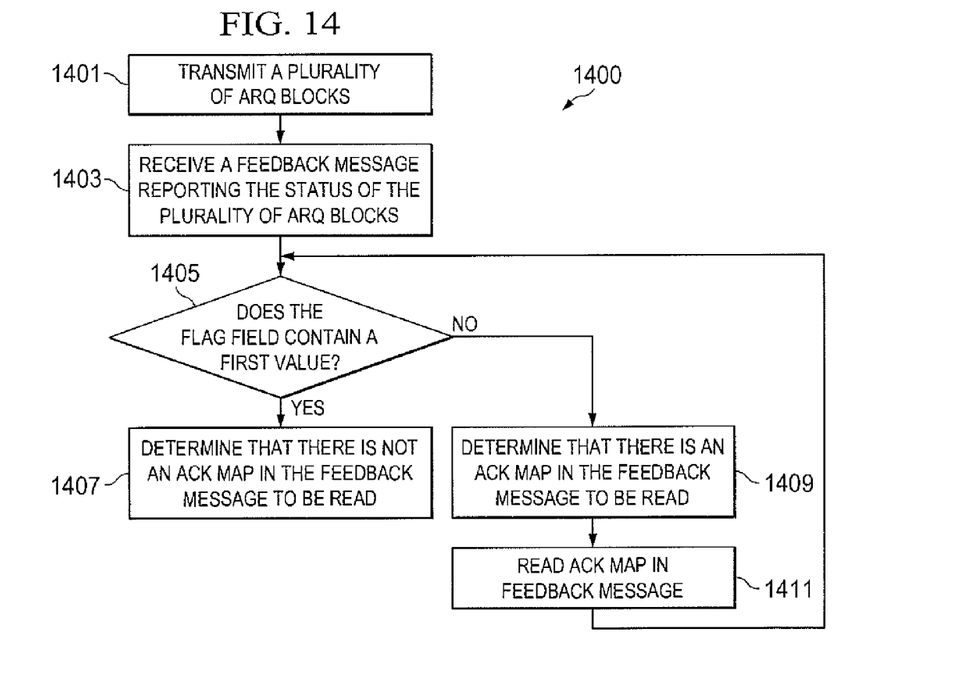
FIG. 14 illustrates a method of processing an ARQ feedback message according to an embodiment of the present disclosure.

FIG. 14 illustrates a method 1400 of processing an ARQ feedback message according to an embodiment of the present disclosure.

As shown in FIG. 14, an ARQ transmitter transmits a plurality of ARQ blocks (block 1401) to an ARQ receiver and receives a feedback message from the ARQ receiver indicating the status of the plurality of ARQ blocks (block 1403). The transmitter reads the first flag field in the feedback message and determines if the flag field contains a first value such as 0 (block 1405). If the flag field contains the first value, the transmitter determines that there is no ACK MAP in the feedback message to be read (block 1407). If the flag field contains a second value such as 1, the transmitter determines that there is at least one ACK MAP in the feedback message to be read (block 1409) and reads the ACK MAP (block 1411). After the transmitter reads the ACK MAP, the transmitter then reads the next flag field in the feedback message to determine if there is another ACK MAP to be read (block 1405).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An automatic repeat request (ARQ) receiver comprising:
a receiver configured to receive one or more of a plurality of ARQ blocks transmitted to the receiver; and
a processor configured to generate a feedback message configured to provide status of the plurality of ARQ blocks, the feedback message comprising:
an acknowledgement sequence number (ACK_SN) field, and
a first flag field,
wherein the processor is configured to provide a first value in the first flag field as an indicator that the feedback message contains only the ACK_SN field and the first flag field,
wherein the processor is configured to provide a second value in the first flag field as an indicator that the feedback message contains a first set of N number of 1-bit fields in addition to the ACK_SN field and the first flag field, each of the N number of 1-bit fields in the first set indicating a receipt status of one of the ARQ blocks,
wherein when the first flag field has the second value, the feedback message includes a second flag field following the first set of N number of 1-bit fields, and
when the second flag field has the second value, the feedback message includes a second set of N 1-bit fields directly after the second flag field and at least a third flag field directly after the second set of N 1-bit fields.

2. An ARQ receiver in accordance with claim 1 wherein the first flag field is a 1-bit flag field.

3. An ARQ receiver in accordance with claim 1 wherein the first set of N number of 1-bit fields contain status information for ARQ blocks corresponding to ACK_SN+1 to ACK_SN+N.

4. An ARQ receiver in accordance with claim 1 wherein the first set of N number of 1-bit fields contain status information for ARQ blocks corresponding to ACK_SN−N to ACK_SN.

5. An ARQ receiver in accordance with claim 1 wherein the processor is configured to provide the first value in the first flag field in response to identifying that all the ARQ blocks up to ACK_SN have been successfully accepted by the ARQ receiver.

6. An ARQ receiver in accordance with claim 1, wherein the number "N" of 1-bit fields in the first set of N 1-bit fields is pre-determined.

7. An ARQ receiver in accordance with claim 1, wherein when the second flag field is set to the first value, the feedback message includes only the ACK_SN field, the first and second flag fields, and the first set of N 1-bit fields.

8. An ARQ receiver in accordance with claim 1 wherein the flag field forms a chain of a fixed-length of one or more fields with a last field having the first value.

9. A method of operating an automatic repeat request (ARQ) receiver, the method comprising:
receiving one or more of a plurality of ARQ blocks transmitted to the ARQ receiver;
generating a feedback message configured to provide status of the plurality of ARQ blocks, the feedback message comprising:
an acknowledgement sequence number (ACK_SN) field, and
a first flag field; and
providing a first value in the first flag field as an indicator that the feedback message contains only the ACK_SN field and the first flag field;
providing a second value in the first flag field as an indicator that the feedback message contains a first set of N number of 1-bit fields in addition to the ACK_SN field and the first flag field, each of the N number of 1-bit fields in the first set indicating a receipt status of one of the ARQ blocks, and
wherein when the first flag field has the second value, the feedback message includes a second flag field following the first set of N number of 1-bit fields, and
wherein when the second flag field has the second value, the feedback message includes a second set of N 1-bit fields directly after the second flag field and at least a third flag field directly after the second set of N 1-bit fields.

10. A method in accordance with claim 9, wherein the number "N" of 1-bit fields in the first set of N 1-bit fields is pre-determined.

11. An automatic repeat request (ARQ) transmitter comprising:
a transmitter configured to transmit a plurality of ARQ blocks;
a receiver configured to receive a feedback message configured to provide status of the plurality of ARQ blocks, the feedback message comprising:
an acknowledgement sequence number (ACK_SN) field, and
a first flag field; and
a processor configured to determine that the feedback message contains only the ACK_SN field and the first flag field in response to identifying that the first flag field contains a first value;
wherein the processor is further configured to determine that the feedback message contains a first set of N number of 1-bit fields and a second flag field following the first set of N number of 1-bit fields in addition to the ACK_SN field and the first flag field in response to identifying that the first flag field contains a second value,
wherein each of the N number of 1-bit fields in the first set indicate a receipt status of one of the ARQ blocks, and wherein when the second flag field has the second value, the feedback message includes a second set of N 1-bit fields directly after the second flag field and at least a third flag field directly after the second set of N 1-bit fields.

12. An ARQ transmitter in accordance with claim 11 wherein the first flag field is a 1-bit flag field.

13. An ARQ transmitter in accordance with claim 11 wherein the first set of N number of 1-bit fields contain status information for ARQ blocks corresponding to ACK_SN+1 to ACK_SN+N.

14. An ARQ transmitter in accordance with claim 11 wherein the first set of N number of 1-bit fields contain status information for ARQ blocks corresponding to ACK_SN−N to ACK_SN.

15. An ARQ transmitter in accordance with claim 11 wherein the processor is further configured to determine that all the ARQ blocks up to ACK_SN have been successfully accepted by an ARQ receiver in response to identifying that the first flag field contains the first value.

16. An ARQ transmitter in accordance with claim 11, wherein the number "N" of 1-bit fields in the first set of N 1-bit fields is pre-determined.

17. An ARQ transmitter in accordance with claim 11, wherein when the second flag field is set to the first value, the feedback message includes only the ACK_SN field, first and second flag fields, and the first set of N 1-bit fields.

18. An ARQ transmitter in accordance with claim 11 wherein the processor is further configured to determine that the flag field forms a chain of a fixed-length of one or more fields with a last field having the first value.

19. A method of operating an automatic repeat request (ARQ) transmitter, the method comprising:
  transmitting a plurality of ARQ blocks;
  receiving a feedback message configured to provide status of the plurality of ARQ blocks, the feedback message comprising:
    an acknowledgement sequence number (ACK_SN) field, and
    a first flag field; and
  determining that the feedback message contains only the ACK_SN field and the first flag field in response to identifying that the first flag field contains a first value; and
  determining that the feedback message contains a first set of N number of 1-bit fields and a second flag field following the first set of N number of 1-bit fields in addition to the ACK_SN field and the first flag field in response to identifying that the first flag field contains a second value,
  wherein each of the N number of 1-bit fields in the first set indicate a receipt status of one of the ARQ blocks, and
  wherein when the second flag field has the second value, the feedback message includes a second set of N 1-bit fields directly after the second flag field and at least a third flag field directly after the second set of N 1-bit fields.

20. A method in accordance with claim 19, wherein the number "N" of 1-bit fields in the first set of N 1-bit fields is pre-determined.

\* \* \* \* \*